United States Patent

[11] 3,583,250

[72] Inventor Robert M. Kongelka
 Houston, Pa.
[21] Appl. No. 811,991
[22] Filed Apr. 1, 1969
[45] Patented June 8, 1971
[73] Assignee RCA Corporation

[54] TRANSMISSION INCLUDING TOOTHED BELT AND PARTIALLY TOOTHED PULLEY
7 Claims, 3 Drawing Figs.

[52] U.S. Cl.................................................. 74/226, 74/229, 74/230.5
[51] Int. Cl...................................................... F16h 7/12, F16h 55/36
[50] Field of Search............................................ 74/226, 230.5, 229, 216.5, 435

[56] References Cited
UNITED STATES PATENTS
901,032 10/1908 Patten ........................... 74/435
1,068,129 7/1913 Hess................................ 74/435X
1,151,220 8/1915 Scherling....................... 74/435
2,175,311 10/1939 Preston ......................... 74/435X Primary Examiner—Leonard H. Gerin
Attorney—Edward J. Norton ABSTRACT: A transmission is provided including two pulley wheels which re coupled by a toothed belt. One of the pulleys has teeth along the complete periphery thereof, and the other pulley has groups of teeth positioned in spaced relation along the periphery thereof. When the belt is loose, the teeth of the belt are disengaged from the teeth of the other pulley by the stiffness of the belt, permitting slipping of the belt with respect to the other pulley. When the belt is tight, the belt conforms itself to the periphery of the other pulley, whereby the teeth of the belt mesh with the teeth of the pulley providing a positive drive.

PATENTED JUN 8 1971
3,583,250.
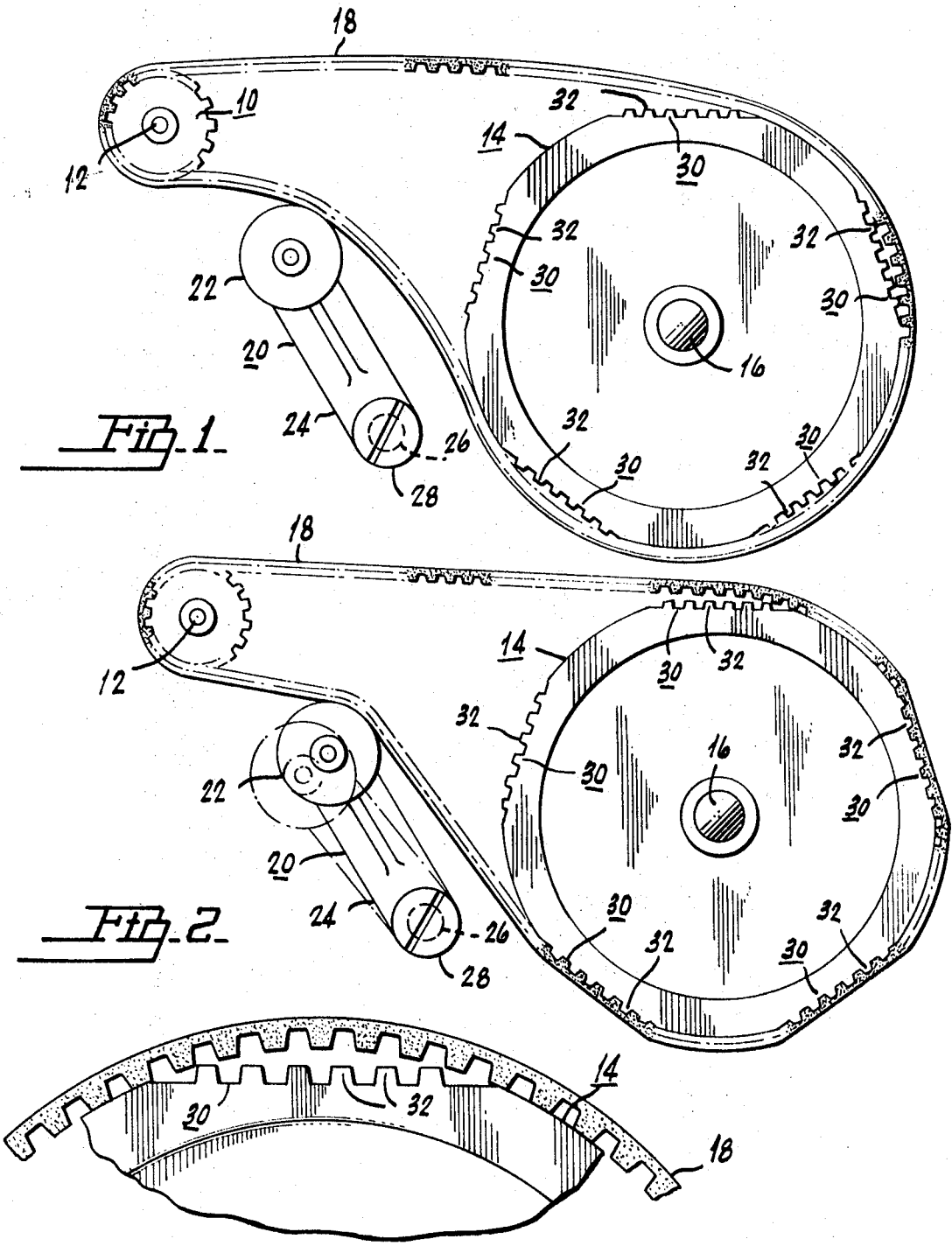
INVENTOR
ROBERT M. KONGELKA
BY Simon Yaffee
ATTORNEY

TRANSMISSION INCLUDING TOOTHED BELT AND PARTIALLY TOOTHED PULLEY

This invention relates to a releasable transmission including a toothed belt.

In many applications, releasable positive coupling is desirable between two spaced pulleys which are coupled by a belt, one of the pulleys being fixed to and being rotatable with a power driven axle and the other pulley being fixed to an axle to which a load is applied. One such application is in the means for rewinding a film after it has been projected on a viewing screen. During film projection, it is desirable to permit the reel having the film thereon to be driven by the pull on the film as it is fed to the film projection mechanism of the projector. During rewind, it is desirable to drive the now empty reel positively. An untoothed tightenable belt coupling a drive pulley and a driven pulley permits slipping even when the belt is tight. Use of a toothed belt with toothed pulleys provides positive drive but also provides problems in releasing the transmission comprising the two toothed pulleys and the toothed belt.

It is an object of this invention to provide an improved releasable transmission comprising a pair of toothed pulleys and a toothed belt.

According to this invention, a drive pulley and a driven pulley are coupled by a toothed belt. One of the pulleys may have teeth all along the periphery thereof. The other pulley has a plurality of discrete groups of teeth, the groups being spaced along the periphery of the other pulley, where the term plurality is intended to mean more than one. The radii of the tops of the teeth are equal to or less than the radius of the untoothed portion of the other pulley. When the toothed belt is loose, the stiffness of the belt causes the belt teeth to clear the teeth of the other pulley, whereby the transmission is released and the rotation of the other pulley and the motion of the belt is independent one of the other. When the belt is tight, the belt conforms itself to the periphery of the other pulley, whereby the other pulley teeth and the belt teeth mesh to provide a positive drive mechanism. The roots of the teeth on the other pulley may lie in a straight line chord of the circle comprising the circumference of the driven pulley.

The invention may be better understood upon reading the following description in connection with the accompanying drawing in which:

FIG. 1 illustrates the transmission of this invention in its released condition, FIG. 2 illustrates the transmission of Figure 1 in its driving condition, and FIG. 3 is an enlarged view of a group of teeth of one of the pulleys.

Turning first to FIG. 1, a driven toothed pulley 10 is provided which is fixed to and causes rotation of axle 12 on which a rotatable load, such as a reel for film (not shown) may be fixed. A driver pulley 14 is spaced from the pulley 10. The pulley 14 is fixed to and rotates with an axle 16 which may be power driven. A plurality of groups of teeth 30, herein shown as five groups 30 of five teeth 32 each, is provided along the periphery of the pulley 14. A toothed belt 18 couples the pulleys 10 and 14. A belt tightener 20 is provided. The belt tightener 20 comprises a rotatable roller or drum 22 mounted for rotation on an arm 24 which is itself pivoted about an axle 26 which may have a slotted head 28. The axles 12, 16 and 26 are each mounted in fixed position in a support frame (not shown), the axles 12 and 16 being rotatable with respect to the frame and the axle 26 being fixed with respect thereto. Means are provided to hold the arm 24 and therefore the drum 22 in the position shown in FIG. 1 when desired whereby the belt 18 is loose. When the belt 18 is loose, the teeth of the belt 18 which are in contact with the untoothed portion of the pulley 14 are held at a distance from the axle 16 which is equal to the radius of the untoothed portion of the periphery of the pulley 14. Due to the stiffness of the belt 18, the remainder of the belt 18 which is adjacent to the periphery of the pulley 14 is held at this radial distance from the axle of the pulley 14 whereby, when the belt 18 is loose, the teeth of the belt 14 do not mesh with the teeth of the pulley 14. To provide the necessary degree of stiffness a belt having glass fiber reenforcement may be used.

The periphery of the pulley 14 is untoothed for several discrete portions thereof, shown in FIGS. 1 and 2 as five portions and a discrete group 30 of teeth 32 is provided between each two successive untoothed portions of the periphery. As shown in FIG. 3, no portion of any of the teeth 32 extends radially beyond the untoothed portion of the pulley 14. Furthermore, the bottoms and tops of the teeth 32 are chords of the circle describing the pulley 14 if it had no teeth at all. Therefore, the teeth of any loose belt 18 which rides on the periphery of the pulley 14 are raised away from the toothed portion of the pulley 14 by the stiffness of the belt 18 and do not mesh teeth while the belt 18 is loose. The number of discrete toothed and untoothed portions are so chosen and proportioned and positioned so that at least one toothed portion of the periphery of the pulley, or a substantial part thereof, will be in position to mesh with the belt 18 no matter what the rotational position of the pulley 14 may be. To accomplish this, the groups 30 of teeth 32 may be uniformly spaced and one group of teeth or at least portions of two groups of teeth will be in each semiperiphery of the gear.

FIG. 2 is identical with FIG. 1 except that the arm 24 of the belt tightener 20 has been moved by means not shown to belt tightening position. In the showing of FIG. 2 while the untoothed portion of the pulley 14 still holds the teeth of the belt 18 at a radial distance from the axle 16 which is equal to or greater than the radial distance to the tops of the teeth, still the tensioning of the belt 18 provided by the belt tensioner 20 overcomes the stiffness of the belt 18 and causes the portion of the belt 18 which is in contact with the periphery of the pulley 14 and between the untoothed portion of the pulley 14 to mesh with the teeth of the groups 30 thereof, whereby a positive drive of the pulley 10 by means of the pulley 14 and the belt 18 takes place when the belt 18 is tensioned.

What I claim is:

1. A pulley for a toothed belt said pulley having an untoothed peripheral portion and a toothed peripheral portion, all points on the teeth in said toothed portion extending radially a distance no greater than the radial distance of said untoothed portion, the roots of the teeth in said toothed portion being a chord of a circle having the radius of the untoothed portion of the pulley and wherein the tops of several of the teeth comprises another chord of the same circle.

2. A pulley for a toothed belt said pulley having a plurality of untoothed peripheral portions and toothed peripheral portions, all points on the teeth in said toothed portions extending radially a distance no greater than the radial distance of said untoothed portions, the number of toothed portions and the number of teeth in the toothed portions and the arrangement of the toothed portions being such that each semiperiphery of the pulley contains a plurality of teeth, the roots of the teeth comprising the group of teeth being a chord of a circle having the radius of the untoothed portions of the pulley and wherein the tops of several of the teeth comprises another chord of the same circle.

3. A transmission comprising two pulleys coupled by a toothed belt one of said pulleys having an untoothed peripheral portion and a toothed peripheral portion, said belt being sufficiently stiff so that the teeth on said belt and the teeth on said pulley do not mesh when the belt is loose.

4. The invention as expressed in claim 3 in which means are provided to tighten said belt, said belt being sufficiently flexible so that the teeth on said belt and the teeth on said pulley mesh when said belt is tightened.

5. The invention as expressed in claim 3 in which the toothed portion and the number of teeth in the toothed portion and the arrangement of the toothed portion is such that each semiperiphery of the pulley contains a plurality of teeth.

6. The invention as expressed in claim 3 in which the roots of the teeth comprising the group of teeth is a chord of a circle having the radius of the untoothed portion of the pulley and wherein the tops of several of the teeth comprises another chord of the same circle.

7. The invention as expressed in claim 3 in which all points on the teeth in said toothed portion extend radially a distance no greater than the radial distance of said untoothed portion.